US007863459B2

(12) United States Patent
Lines

(10) Patent No.: US 7,863,459 B2
(45) Date of Patent: Jan. 4, 2011

(54) PROCESS FOR PREPARING ONIUM SALTS

(75) Inventor: Robert Lines, Kent (GB)

(73) Assignee: Sun Chemical Corporation, Parsippany, NJ (US)

( * ) Notice: Subject to any disclaimer, the term of this patent is extended or adjusted under 35 U.S.C. 154(b) by 232 days.

(21) Appl. No.: 12/094,563

(22) PCT Filed: Dec. 18, 2006

(86) PCT No.: PCT/US2006/048096

§ 371 (c)(1),
(2), (4) Date: May 21, 2008

(87) PCT Pub. No.: WO2007/075498

PCT Pub. Date: Jul. 5, 2007

(65) Prior Publication Data

US 2008/0287686 A1 Nov. 20, 2008

(30) Foreign Application Priority Data

Dec. 16, 2005 (GB) ................... 0525679.7

(51) Int. Cl.
*C07D 233/00* (2006.01)
(52) U.S. Cl. .................. 548/349.1; 568/9; 568/77; 564/282; 564/296
(58) Field of Classification Search ............. 548/349.1; 568/9, 77; 564/282, 296
See application file for complete search history.

(56) References Cited

U.S. PATENT DOCUMENTS 5,374,302 A * 12/1994 Bauer et al. ............. 106/31.47

| 5,472,668 | A | 12/1995 | Mills et al. |
| 5,480,611 | A | 1/1996 | Mills et al. |
| 5,507,840 | A | 4/1996 | Schrell et al. |
| 5,849,594 | A | 12/1998 | Balderson et al. |
| 6,086,661 | A * | 7/2000 | Malhotra et al. ......... 106/31.43 |
| 6,248,161 | B1 * | 6/2001 | Nguyen et al. .......... 106/31.27 |
| 6,620,957 | B1 | 9/2003 | Tomita et al. |

FOREIGN PATENT DOCUMENTS

| FR | 807052 | 1/1937 |
| GB | 271580 | 6/1927 |
| WO | WO-9313048 | 7/1993 |
| WO | WO-9624054 | 8/1996 |
| WO | WO-0002844 | 1/2000 |
| WO | WO-0002845 | 1/2000 |

OTHER PUBLICATIONS

Dutta et al., 1995, CAS: 122:136794.*
Mills, Andrew et al., "Equilibrium Studies on Colorimetric Plastic Film Sensors for Carbon Dioxide", Anal. Chem. 1992, 64, 1383-1389.

* cited by examiner

*Primary Examiner*—Rei-tsang Shiao
(74) *Attorney, Agent, or Firm*—Dickstein Shapiro LLP

(57) ABSTRACT

An 'onium salt, e.g. a quaternary ammonium salt, of an anionic dye may be prepared by mixing an aqueous solution of a salt of the dye with a solution of a water-insoluble 'onium salt in an organic solvent, and separating a solution of the 'onium salt of the anionic dye in the organic solvent from the residual aqueous solution.

20 Claims, No Drawings

PROCESS FOR PREPARING ONIUM SALTS

The present invention relates to a novel process for the preparation of 'onium salts, i.e. quaternary ammonium and similar salts, of anionic dyes, especially for use in colorimetric sensors, particularly for the detection of carbon dioxide.

Mills et al. [Anal. Chem. 1992, 64, 1383-1389] outlines the principles of a colorimetric carbon dioxide film sensor based on lipophilic dye quaternary ammonium salts. In this paper, the indicator solutions are prepared by reacting the pH-sensitive dye with an excess of tetraoctylammonium hydroxide in methanol. The use of excess quaternary ammonium salt appears to be necessary for the reliable function of the sensor, presumably by maximizing the amount of bound water in the film. An ink formulation is prepared by adding a binder (e.g. ethyl cellulose) and a plasticiser (e.g. tributyl phosphate) to the dye solution. This ink may then be printed using any appropriate printing technique onto a suitable substrate to form the calorimetric sensor.

Colorimetric carbon dioxide sensors have a variety of uses, including in medical instrumentation and in food packaging, and it is clear that, at least for these uses, it is at least desirable, and, in some cases, may be essential, to avoid contamination of the sensor by toxic materials. Unfortunately, the methods used for the commercial production of quaternary ammonium salts generally use methanol or an equally undesirable solvent and most quaternary ammonium salts are supplied in methanolic solution. Thus, if these are to be used for medical or food applications, it is necessary to remove the methanol very thoroughly, which adds considerably to expense. In any event, even the use of methanol during the production process is generally regarded as unacceptable where the finished product is to be used for medical or food applications.

U.S. Pat. No. 5,472,668 describes the use of quaternary ammonium salts as indicators for the presence and level of carbon dioxide. The quaternary ammonium salts are prepared in methanol. U.S. Pat. No. 5,480,611, U.S. Pat. No. 5,849,594, WO 00/02844, WO 00/02845, WO 93/13048 and WO 96/24054 describe variations on this.

FR 807052 and GB 271580 describe the preparation of various quaternary ammonium, phosphonium or sulphonium salts soluble in organic solvents by reaction of an aqueous solution of a simple salt of the quaternary ammonium, phosphonium or sulphonium, e.g. the chloride, with an aqueous solution of an appropriate dyestuff. The resulting salt precipitates out of the aqueous solution and may then, if desired, be separated and, if required, dissolved in an organic solvent.

We have now discovered a simple process for preparing quaternary ammonium salts of anionic dyes, which enables the use of methanol to be avoided and which allows the salt to be prepared, if desired, in the solvent in which it is to be used. The process also allows quaternary ammonium salts such as the chloride to be used, since this is considerably cheaper and more readily available than the hydroxide used in the prior art. Moreover, it can also be applied to the preparation of analogous 'onium salts where the nitrogen is replaced by sulphur or phosphorous.

Thus, the present invention consists in a process for preparing an 'onium salt of an anionic dye, which comprises mixing an aqueous solution of a salt of the dye with a solution of a water-insoluble salt of formula (I) in a water-immiscible organic solvent, and separating a solution of the 'onium salt of the anionic dye in the organic solvent from the residual aqueous solution, the water-insoluble salt of formula (I) being:

(I)

(where:

X represents a nitrogen, sulphur or phosphorus atom;

R represents: a $C_1$-$C_{50}$ alkyl group which is unsubstituted or is substituted by at least one cycloalkyl, aryl, acyloxy or heterocyclic group, or whose carbon chain is interrupted by at least one unsaturated carbon-carbon bond or by at least one cycloalkyl, aryl or heterocyclic group; an aryl group; or a heterocyclic group; and the groups R may be the same as or different from each other; or, when X represents a nitrogen atom, two or three groups R, together with the nitrogen atom to which they are attached may represent a nitrogen-containing heterocyclic group; or one or two of the groups R may represent a polymeric group;

n represents the number of available valences of the atom X;

or said group of formula (I) represents a repeating unit in a polymer; and $Y^-$ represents an anion).

In the compounds of formula (I), X may represent a nitrogen, phosphorus or sulphur atom, to prepare, respectively, ammonium, phosphonium or sulphonium salts, in which n is, respectively, 4, 4 or 3. X is most preferably a nitrogen atom.

Where R represents an alkyl group, this may be a straight or branched chain group having from 1 to 50 carbon atoms. Examples of such groups include the methyl, ethyl, propyl, isopropyl, butyl, isobutyl, t-butyl, pentyl, isopentyl, neopentyl, 2-methylbutyl, 1-ethylpropyl, 4-methylpentyl, 3-methylpentyl, 2-methylpentyl, 1-methylpentyl, 3,3-dimethylbutyl, 2,2-dimethylbutyl, 1,1-dimethylbutyl, 1,2-dimethylbutyl, 1,3-dimethylbutyl, 2,3-dimethylbutyl, 2-ethylbutyl, hexyl, isohexyl, heptyl, octyl, nonyl, decyl, dodecyl, tridecyl, pentadecyl, octadecyl, nonadecyl, eicosyl, docosyl, pentacosyl, triacontyl and pentacontyl groups. Where they are unsubstituted, at least some of the groups R preferably have from 4 to 20 carbon atoms, and more preferably the sum of the carbon atoms in the groups R is at least 24.

Where R represents a cycloalkyl group, this preferably has from 3 to 8 carbon atoms, and examples include the cyclopropyl, cyclobutyl, cyclopentyl, cyclohexyl, cycloheptyl and cyclooctyl groups, of which the cyclohexyl group is preferred.

Where R represents an aryl group, this is an aromatic carbocyclic group, preferably having from 6 to 14 carbon atoms, and examples include the phenyl and naphthyl groups, of which the phenyl group is preferred.

Where R represents an acyloxy group, this is preferably a carboxylic acyloxy group and preferably has from 2 to 12 carbon atoms. It may be saturated or unsaturated and examples include the acryloyloxy, methacryloyloxy, propioloyloxy, crotonoyloxy, acetoxy, propionyloxy, butyryloxy, valeryloxy, pivaloyloxy and lauroyloxy groups.

Where R represents a heterocyclic group, this preferably has from 3 to 8 ring atoms, of which from 1 to 3 are preferably hetero-atoms, such as the nitrogen, oxygen or sulphur atoms, and at least one is a carbon atom, the remainder being carbon atoms. Examples of such groups include the pyridyl (1-, 2- or 3-pyridyl), thienyl, furyl, pyranyl, morpholinyl and piperidyl groups, preferably the pyridyl groups.

Where R represents an alkyl group whose carbon chain is interrupted by a cycloalkyl, aryl or heterocyclic group, the alkyl part may be any of the alkyl groups exemplified above and the cycloalkyl, aryl or heterocyclic part may be any of those groups as exemplified above. Examples of such groups include the butylcyclohexyl, n-amylcyclohexyl, hexylcyclohexyl and dodecylcyclohexyl groups.

Alternatively, if desired, the carbon chain of such an alkyl group may include one or more carbon-carbon double or treble bonds, i.e. it may be an alkenyl or alkynyl group. Such unsaturated groups preferably have from 2 to 18, more preferably from 4 to 10 carbon atoms. Examples of such groups include the butenyl, hexenyl and octenyl groups.

Alternatively, where X represents a nitrogen atom, two or three of the groups R, together with that nitrogen atom, may represent a nitrogen-containing heterocyclic group. The heterocyclic group preferably contains 5 or 6 ring atoms, one of the atoms being carbon, oxygen, sulphur or nitrogen and the rest being carbon. Suitable such heterocyclic groups include the pyrrol-1-yl, 2H-pyrrol-1-yl, 1- or 3-imidazolyl, 1- or 2-pyrazolyl, 3-thiazolyl, 3-oxazolyl, 2-isothiazolyl, 2-isoxazolyl, 1-pyridyl, 1-pyrazinyl, 1-pyrimidinyl, 1-pyridazinyl, 1-indolyl, 3H-indol-1-yl, 20 isoindolyl, 1-quinolyl, 2-phthalazinyl, 9-carbazolyl, 1-pyrrolidinyl, 1-pyrrolinyl, 1-imidazolidinyl, 2-imidazolin-1-yl, 1-pyrazolinyl, piperidino, 1-indolinyl and morpholino groups. Examples of compounds containing such groups include those of formula (II):

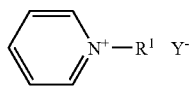

(II)

(in which $R^1$ represents a $C_1$-$C_{20}$ alkyl group or a benzyl group and $Y^-$ is as defined above) and those of formula (III):

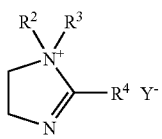

(III)

(in which $R^2$ represents a $C_1$-$C_{20}$ alkyl group; $R^3$ represents a $C_1$-$C_{20}$ alkyl group which is unsubstituted or is substituted by one or more hydroxy or amino groups; $R^4$ represents a hydrogen atom or a $C_1$-$C_{50}$ alkyl group, whose carbon chain may be interrupted by or substituted by at least one cycloalkyl, aryl or heterocyclic group or may be interrupted by at least one unsaturated carbon-carbon bond (e.g. carbon-carbon double bonds).

Examples of the groups which may be represented by $R^2$, $R^3$, and $R^4$ are as given in relation to the equivalent groups which may be represented by $R^1$. $R^4$ is preferably a lauryl, heptadecyl, octadecyl or tallow group.

As a further alternative, the compound of formula (I) may be a polymeric compound, for example a compound of formula (IV):

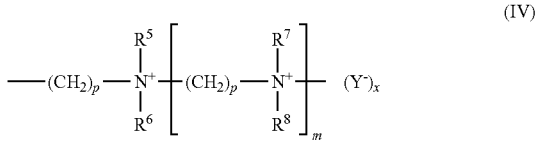

(IV)

(in which: $R^5$, $R^6$, $R^7$ and $R^8$ are the same as or different from each other and each represents a $C_4$-$C_{20}$ alkyl group; m is a number from 1 to 100; p is a number from 1 to 7; $Y^-$ is as defined above; and x is the number of $Y^-$ anions, which equates to the number of quaternary ammonium groups in the compound) or a compound of formula (V):

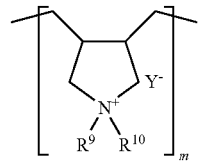

(in which: $R^9$ and $R^{10}$ are the same as or different from each other and each represents a $C_4$-$C_{20}$ alkyl group or a benzyl group; and $Y^-$ and m are as defined above). Examples of the alkyl groups which may be represented by $R^9$ and $R^{10}$ include those alkyl groups having from 4 to 20 carbon atoms and included in the alkyl groups represented by R.

Specific examples of the polymers represented by formulae (IV) and (V) may be found in WO 00/02844, the disclosure of which is incorporated herein by reference.

Where R is or includes an unsaturated group, this may be polymerised, either alone or with a comonomer to give a polymer containing the 'onium group in a side chain. Examples of suitable comonomers include the alkyl acrylates and methacrylates, such as methyl or ethyl acrylate or methacrylate.

Examples of the anion represented by $Y^-$ include the halides (fluoride, chloride, bromide, iodide), carbonate, tetrafluoroborate, sulphate, hydrogensulphate, phosphate and methosulphate groups.

Since the 'onium salt of the dye is water-insoluble but will be soluble in standard organic solvents, the dye tends to transfer to the organic layer and may easily be separated. Provided a stoichiometric excess of the 'onium salt over dye is employed, the reaction will be forced to proceed until all dye has been converted to its 'onium salt. Accordingly, we prefer to employ a stoichiometric excess of the water-insoluble 'onium salt over the salt of the dye, preferably at least a 2:1 excess and more preferably about a 5:1 excess. Moreover, as previously noted, the use of an excess of 'onium salt appears necessary for the reliable function of a $CO_2$ sensor employing such a salt, presumably by maximizing the amount of bound water in the film.

Quaternary ammonium salts tend to become water insoluble when the cation exceeds a certain molecular weight, which, in the case of symmetrical quaternary salts equates to having at least 24 carbon atoms, and so such quaternary ammonium salts are preferred. The salts used may be simple salts, such as the fluoride, chloride, bromide, iodide, carbonate, tetrafluoroborate, sulphate, hydrogensulphate or phosphate. Examples of such salts include the benzyltrimethylammonium, methyltrioctylammonium, tetrabutylammonium, tetrahexylammonium, and tetraoctylammonium salts, especially the chlorides thereof. Of these, the tetraalkylammonium compounds are preferred, methyltrioctylammonium chloride being most preferred.

Examples of phosphonium salts include n-hexyltriphenylphosphonium bromide, n-heptyltriphenylphosphonium bromide, benzyltriphenylphosphonium chloride, and dodecyltriphenylphosphonium bromide. Examples of sulphonium salts include dibenzylmethylsulphonium tetrafluoroborate, dimethyl (2-hydroxy-5-nitrobenzyl)sulphonium bromide, and dimethyl (2-methoxy-5-nitrobenzyl)sulphonium bromide. Examples of imidazolinium compounds include 1-methyl-1-(tallowylamido)ethyl-2-tallowylimidazolinium methosulphate and 1-methyl-1-(palmitoylamido)ethyl-2-octadecylimidazolinium methosulphate.

Examples of suitable pH-sensitive anionic dyes include: azo dyes, such as α-naphthol orange; nitrophenol dyes, such as m-nitrophenol or p-nitrophenol; phthalein dyes, such as α-naphtholphthalein or o-cresolphthalein; sulphonephthalein dyes, such as m-cresol purple, cresol red, thymol blue and α-naphtholsulphonephthalein; triphenylmethane dyes, such as rosolic acid; indigo derivatives such as indigo disulphonic acid; and indophenol dyes, such as indophenol or 1-naphthol-s-sulphonic acid indophenol.

These dyes should be used in the form of a salt with a cation. Suitable cations include: alkali metal ions, such as the sodium or potassium ions; alkaline earth metal ions, such the calcium or barium ions; salts of low molecular weight amines such as methylamine and dimethylamine; or ammonium ions.

The organic solvent employed should be capable of dissolving the 'onium salt starting material and the 'onium salt of the dye. It should also be substantially immiscible with water. Provided it meets these two criteria, there is no other substantial limitation on its nature, although it is preferably acceptable for use in the preparation of materials for medicinal or food use. Examples of suitable solvents include: carboxylic acid esters such as ethyl acetate and benzyl acetate; aliphatic and cycloaliphatic hydrocarbons such as heptane and cyclohexane; aromatic hydrocarbons such as toluene, chlorinated hydrocarbons such as chloroform and 1,2-dichloroethane; ketones such as methyl hexyl ketone and acetophenone; carbonates such as diethyl carbonate and propylene carbonate; and silicones such as polydimethyl siloxane (Dimethicone).

The reaction will normally take place readily at normal ambient temperatures and pressures, and so no special conditions are required, although, in special circumstances, if desired, the reaction may take place with heating or cooling.

Following the reaction, separation of the desired product is simple. The organic layer is separated from the aqueous layer, and dried. Provided the organic solvent used for the reaction was suitably chosen, the resulting solution is now ready for use. Alternatively, if desired, the solvent may be removed by various conventional means.

The invention is further illustrated by the following Examples.

EXAMPLE 1

Preparation of Cresol Red Quaternary Salt Solution

Cresol Red (1.91 g, 5 mmol) was dissolved in 200 ml deionised water containing potassium hydroxide (0.9 g, 15 mmol). The solution was placed in a 500 ml separating funnel and ethyl acetate (80 ml) added followed by Aliquat 336 (10.1 g, 25 mmol, methyltrioctylammonium chloride). The mixture was shaken vigorously and then the layers were allowed to separate. The lower, almost colourless, aqueous phase was removed, and the deep blue organic layer was dried over anhydrous sodium sulphate and then filtered under gentle suction. Solids content 31.3% w at 100° C.

Colorimetric analysis of the aqueous layer showed that 99.97% of the cresol red had been extracted into the organic phase.

EXAMPLE 2

The general procedure of Example 1 was repeated but using the following reagents and quantities:

| | |
|---|---|
| m-Cresol Purple | 26.20 g (68.5 mmol) |
| Potassium hydroxide (90%) | 10.85 g (174 mmol) |
| Aliquat 336 | 138.40 g (343 mmol) |
| Deionised water | 1.0 L |
| Ethyl acetate | 0.5 L |

After the organic layer had been dried over anhydrous sodium sulphate, the solution was concentrated under reduced pressure to give an intense blue solution. Solids content 47.1% at 110° C.

EXAMPLE 3

The general procedure of Example 1 was repeated but using the following reagents and quantities:

| | |
|---|---|
| Phenol Red | 25.00 g (66.2 mmol) |
| Potassium hydroxide (90%) | 10.49 g (168 mmol) |
| Aliquat 336 | 133.80 g (331 mmol) |
| Deionised water | 1.0 L |
| Ethyl acetate | 0.5 L |

After the organic layer had been dried over anhydrous sodium sulphate, the solution was concentrated under reduced pressure to give an intense red solution. Solids content 43% at 110° C.

EXAMPLES 4-7

The following dye quaternary ammonium salts in ethyl acetate using Aliquat 336 were prepared by the method of Example 1.

| Example | Dye | Dye:Aliquat mol/mol | Comments |
|---|---|---|---|
| 4 | Brilliant Yellow | 1:6 | Deep red solution |
| 5 | 4-Nitro Phenol | 1:2 | Red solution |
| 6 | Phenolphthalein | 1:5 | Pale red solution |
| 7 | Tetrabromo phenolphthalein | 1:5 | Very pale purple solution |

EXAMPLES 8-10

A stock solution of Cresol Red was prepared by dissolving the dye (0.58 g, 1.5 mmol) in an aqueous solution containing sodium hydroxide (0.18 g, 4.5 mmol) and making up to 50 g total solution weight. Particular amounts of this solution were then added to 1 g each of the quaternary salts listed below dissolved in 10 ml of dichloromethane contained in separating funnels.

| Example | Quaternary salt | Weight of added Cresol Red solution[1] |
|---|---|---|
| 8 | Dodecyltriphenyl phosphonium bromide | 12.93 g |
| 9 | Benzyltriphenyl phosphonium chloride | 17.24 g |
| 10 | Triphenyltetrazolium chloride | 19.83 g |

[1]Cresol Red:Quat salt = 1:5 mol/mol

The mixtures were vigorously shaken and, after separation, the lower, intensely coloured layers were removed and dried over anhydrous sodium sulphate.

EXAMPLE 11

Cresol Red (1.23 g, 3.2 m mol) was dissolved in an aqueous solution (50 ml) containing sodium hydroxide (3.0 g, 4.8 mmol). To this deep blue solution was added chloroform (50 ml) in which was dissolved 4,4'-bis(tributylbenzylammonium chloride) (3.0 g, 4.8 mmol). The mixture was vigorously shaken and the separated lower layer removed and dried over anhydrous sodium sulphate. The chloroform was removed under reduced pressure and the residue was dissolved in ethanol to give a dark purple-red solution having 20.5% solids at 130° C.

EXAMPLE 12

Cresol Red (2 g, 5.2 mmol) was dissolved in deionised water (300 ml) containing sodium hydroxide (0.52 g, 13 mmol) and to this solution contained in a 1 L separating funnel was added a solution of 4,4'-bis(trioctylbenzylammonium chloride) (7.5 g, 7.8 mmol) in ethyl acetate (200 ml). The mixture was vigorously shaken and the layers allowed to separate. The intense purple organic layer was recovered and dried over anhydrous sodium sulphate. The ethyl acetate was removed under reduced pressure and the residue dissolved in ethanol to give a deep purple-red solution having 26.5% solids at 110° C.

EXAMPLE 13

Cresol Red (3.82 g, 10 mmol) was dissolved in deionised water (75 ml) containing sodium hydroxide (0.8 g, 20 mmol) and to this solution contained in a 0.5 L separating funnel was added a solution of 4,4'-bis(trioctylbenzylphosphonium chloride) (14.89 g, 15 mmol) in ethyl acetate (120 ml). The mixture was vigorously shaken and the layers allowed to separate. The intense blue organic layer was recovered, dried over anhydrous sodium sulphate and then concentrated under reduced pressure to give a 19.1% solids solution.

EXAMPLE 14

A polymeric quaternary salt was prepared by polymerising methyl methacrylate and acryloyloxyethyl(dibutylbenzylammonium) chloride in a mixture of ethyl acetate and ethanol using azobis(cyclohexanecarbonitrile) as initiator (1% w). The copolymer was insoluble in pure ethyl acetate but soluble in chloroform and had an equivalent weight of 1.71 meq g$^{-1}$. 3-Nitrophenol (0.659 g, 5 mmol) was dissolved in deionised water containing sodium hydroxide (0.25 g) and this red solution was then mixed in a separating funnel with a solution of the copolymer (5 g, 8.55 meq) in chloroform (50 ml). The lower red chloroform layer was recovered and dried over anhydrous sodium sulphate. Removal of the chloroform under reduced pressure gave a red rubbery solid that was soluble in ethyl acetate.

EXAMPLE 15

Sodium bicarbonate (10.08 g, 120 mmol) was dissolved in deionised water (120 ml) and to this solution contained in a separating funnel was added Aliquat 336 (40.4 g, 100 mmol) dissolved in ethyl acetate (100 ml). The mixture was vigorously shaken and, when the layers separated, the upper layer was recovered and dried over anhydrous sodium sulphate. When dilute HCl was added to a sample of this solution fizzing took place, indicating the presence of bicarbonate ion.

An aqueous solution of Phenol Red (3.54 g, 10 mmol) was prepared by dissolving the dye in deionised water (150 ml) containing potassium hydroxide (1.3 g, 20 mmol). To this solution was added a portion of the quaternary ammonium bicarbonate solution prepared above (70.2 g, 50 mmol) and the mixture was vigorously shaken. The organic layer was recovered and dried over anhydrous sodium sulphate to give a deep purple solution of 28.5% solids at 110° C.

EXAMPLE 16

The procedure of Example 10 was repeated, but using Cresol Red (3.82 g, 10 mmol) dye. A deep red solution of 23.1% solids at 110° C. was obtained.

EXAMPLES 17-19

Preparation of $CO_2$ Indicating Inks

The following compositions were prepared.

| Example | Dye Quat Salt solution | Polyvinyl butyral[1] | Polyethylene imine | Plasticiser[2] | Ethanol |
|---|---|---|---|---|---|
| 17 | Example 1, 7.4 g | 1.8 g | 0.2 g | 0.6 g | 10.0 g |
| 18 | Example 12, 5 g | 1.65 g | 0.27 g | — | 7.1 g |
| 19 | Example 14, 5 g | 1.77 g | 0.28 g | — | 8.02 g |

[1]Mowital B20H
[2]Diphenyl-(2-ethylhexyl) phosphate

These inks were applied to clear polypropylene film using a wirebar coater and, upon drying, underwent reversible colour changes when exposed to $CO_2$.

COMPARATIVE EXAMPLE

The method of Example 1 was repeated, except that poly (diallyldimethylammonium chloride) was used as the quaternary salt source. After the mixture had been vigorously shaken and the layers allowed to separate there was no transfer of dye into the ethyl acetate layer. In this case the quaternary ammonium ion lacked sufficient lipophilicity to extract the dye into the organic medium.

The invention claimed is:

1. A process for preparing an onium salt of an anionic dye, which comprises mixing an aqueous solution of a salt of the dye with a solution of a water-insoluble salt of formula (I) in a water-immiscible organic solvent, and separating a solution of the onium salt of the anionic dye in the organic solvent from the residual aqueous solution, the water-insoluble salt of formula (I) being:

$$X^+(R)_nY^-  \qquad (I)$$

where:

X represents a nitrogen, sulphur or phosphorus atom;

R represents: a $C_1$-$C_{50}$ alkyl group which is unsubstituted or is substituted by at least one cycloalkyl, aryl, acyloxy or heterocyclic group, or whose carbon chain is interrupted by at least one unsaturated carbon-carbon bond or by at least one cycloalkyl, aryl or heterocyclic group; an aryl group; or a heterocyclic group; and the groups R may be the same as or different from each other; or, when X represents a nitrogen atom, two or three groups R, together with the nitrogen atom to which they are attached may represent a nitrogen-containing heterocyclic group; or one or two of the groups R may represent a polymeric group;

n represents the number of available valences of the atom X;

or said group of formula (I) represents a repeating unit in a polymer; and

Y⁻ represents an anion, wherein the onium salt is a quaternary ammonium, phosphonium, sulfonium or imidazolinium salt, and wherein the dye is an azo dye, a nitrophenol dye, a phthalein dye, a sulphonephthalein dye, a triphenylmethane dye, or an indophenol dye.

2. A process according to claim 1, in which the water-insoluble onium salt is employed in a stoichiometric excess over the salt of the dye.

3. A process according to claim 2, in which the excess is at least 2:1.

4. A process according to claim 3, in which the excess is about 5:1.

5. A process according to claim 1, in which the onium salt is a quaternary ammonium salt.

6. A process according to claim 5, in which the quaternary ammonium salt is a benzyltrimethylammonium, methyltrioctylammonium, tetrabutylammonium, tetrahexylammonium, or tetraoctylammonium salt.

7. A process according to claim 1, in which the onium salt is a phosphonium salt.

8. A process according to claim 7, in which the phosphonium salt is an n-hexyltriphenylphosphonium, n-heptyltriphenylphosphonium, benzyltriphenylphosphonium or dodecyltriphenylphosphonium salt.

9. A process according to claim 8, in which the phosphonium salt is n-hexyltriphenylphosphonium bromide, n-heptyltriphenylphosphonium bromide, benzyltriphenylphosphonium chloride, or dodecyltriphenylphosphonium bromide.

10. A process according to claim 1, in which the 'onium salt is a sulphonium salt.

11. A process according to claim 10, in which the sulphonium salt is a dibenzylmethylsulphonium, dimethyl (2-hydroxy-5-nitrobenzyl)sulphonium or dimethyl (2-methoxy-5-nitrobenzyl)sulphonium salt.

12. A process according to claim 11, in which the sulphonium salt is dibenzylmethylsulphonium tetrafluoroborate, dimethyl (2-hydroxy-5-nitrobenzyl)sulphonium bromide, or dimethyl (2-methoxy-5-nitrobenzyl)sulphonium bromide.

13. A process according to claim 1, in which the Onium salt is an imidazolinium salt.

14. A process according to claim 13, in which the imidazolinium salt is a 1-methyl-1-(tallowylamido) ethyl-2-tallowylimidazolinium or 1-methyl-1-(palmitoylamido)ethyl-2-octadecylimidazolinium salt.

15. A process according to claim 14, in which the imidazolinium salt is 1-methyl-1-(tallowylamido)ethyl-2-tallowylimidazolinium methosulphate or 1-methyl-1-(palmitoylamido)ethyl-2-octadecylimidazolinium methosulphate.

16. A process according to claim 1, in which the onium salt is a chloride, bromide or sulphate.

17. A process according to claim 1, in which the dye is [alpha]-naphthol orange, m-nitrophenol, p-nitrophenol, α-naphtholphthalein, o-cresolphthalein, m-cresol purple, cresol red, thymol blue, α-naphtholsulphonephthalein, rosolic acid, indophenol or 1-naphthol-s-sulphonic acid indophenol.

18. A process according to claim 17, in which the dye is employed as the sodium or potassium salt.

19. A process according to claim 1, in which the organic solvent is a carboxylic acid ester, an aliphatic or cycloaliphatic hydrocarbon, an aromatic hydrocarbon, a chlorinated hydrocarbon, a ketone, a carbonate, or a silicone.

20. A process according to claim 19, in which the organic solvent is selected from the group consisting of ethyl acetate, benzyl acetate, heptane, cyclohexane, toluene, chloroform, 1,2-dichloroethane, methyl hexyl ketone, acetophenone, diethyl carbonate, propylene carbonate, and polydimethyl siloxane.

* * * * *